US008276359B2

(12) United States Patent
Bondarenko et al.

(10) Patent No.: US 8,276,359 B2
(45) Date of Patent: Oct. 2, 2012

(54) GAS TURBINE PLANT

(75) Inventors: Leonid Markovich Bondarenko, Kolomna (RU); Oleg Alekseevich Grishanov, Samara (RU); Stanislav Mikhailovich Ignachkov, Samara (RU); Valery Semenovich Kossov, Kolomna (RU); Eduard Ivanovich Nesterov, Kolomna (RU); Dmitry Gennadievich Fedorchenko, St. Petersburg (RU)

(73) Assignee: Open Joint Stock Company "Russian Railways", Moscow (RU)

( * ) Notice: Subject to any disclaimer, the term of this patent is extended or adjusted under 35 U.S.C. 154(b) by 452 days.

(21) Appl. No.: 12/451,211

(22) PCT Filed: Sep. 4, 2008

(86) PCT No.: PCT/RU2008/000584
§ 371 (c)(1),
(2), (4) Date: Oct. 30, 2009

(87) PCT Pub. No.: WO2009/031945
PCT Pub. Date: Mar. 12, 2009

(65) Prior Publication Data
US 2010/0115913 A1 May 13, 2010

(30) Foreign Application Priority Data
Sep. 6, 2007 (RU) ................................ 2007133460

(51) Int. Cl.
*F02C 7/08* (2006.01)
(52) U.S. Cl. .......................................... 60/39.08; 60/736
(58) Field of Classification Search .................. 60/39.08, 60/39.465, 730, 736; 184/6.11
See application file for complete search history.

(56) References Cited

U.S. PATENT DOCUMENTS

| 4,041,697 A | * | 8/1977 | Coffinberry et al. | ........ 60/39.281 |
| 4,354,345 A | * | 10/1982 | Dreisbach et al. | .......... 60/39.281 |
| 4,741,152 A | * | 5/1988 | Burr et al. | ........................ 60/772 |

(Continued)

FOREIGN PATENT DOCUMENTS
JP       63-134820 U      6/1988
(Continued)

OTHER PUBLICATIONS

Kossov, V.S., et al., "Locomotive" Magazine, No. 3, pp. 41, (2005). English translation of select Russian text.
Schurovsky, V.A., et al., "Gas-Turbine Traction: History and Prospects", Gas-Turbine Compressor Unit, pp. 85, 87, 88, (1994), M., Nedra Publishing House. English translation of select Russian text.

*Primary Examiner* — Phutthiwat Wongwian
(74) *Attorney, Agent, or Firm* — Nath, Goldberg & Meyer; Jerald L. Meyer

(57) ABSTRACT

A gas-turbine plant including a fuel system coupled to combustion chambers of a gas-turbine engine; the fuel system including fuel pipelines and a device for controlling fuel to the combustion chambers, a lubrication system for friction units of the gas-turbine engine and actuating units; the lubrication system including a lubrication loop for the friction units of the gas-turbine engine and a lubrication loop for the actuating units, each lubrication loop having a fuel-oil cooling heat-exchanger, a supply pump and an oil tank; wherein a first fuel pipeline of the fuel pipelines connects the device to the fuel-oil cooling heat-exchanger of the lubrication loop of the actuating units and the fuel heater, and a second fuel pipeline of the pipelines connects the device to the fuel-oil cooling heat-exchanger of the lubrication loop of the gas-turbine engine and the fuel heater.

2 Claims, 1 Drawing Sheet

U.S. PATENT DOCUMENTS

| | | | |
|---|---|---|---|
| 5,313,790 A * | 5/1994 | Barr | 60/267 |
| 5,544,700 A * | 8/1996 | Shagoury | 165/139 |
| 6,223,523 B1 * | 5/2001 | Frutschi | 60/775 |
| 6,536,381 B2 * | 3/2003 | Langervik | 123/41.33 |
| 8,132,398 B2 * | 3/2012 | Wang et al. | 60/39.281 |
| 2005/0022534 A1 | 2/2005 | Moody | |
| 2005/0081507 A1 * | 4/2005 | Tumelty et al. | 60/39.08 |
| 2011/0302903 A1 * | 12/2011 | Veilleux, Jr. | 60/39.08 |

FOREIGN PATENT DOCUMENTS

| | | |
|---|---|---|
| RU | 2 074 968 C1 | 3/1997 |
| RU | 2 251 505 C1 | 5/2005 |
| SU | 844797 A1 | 7/1981 |

* cited by examiner

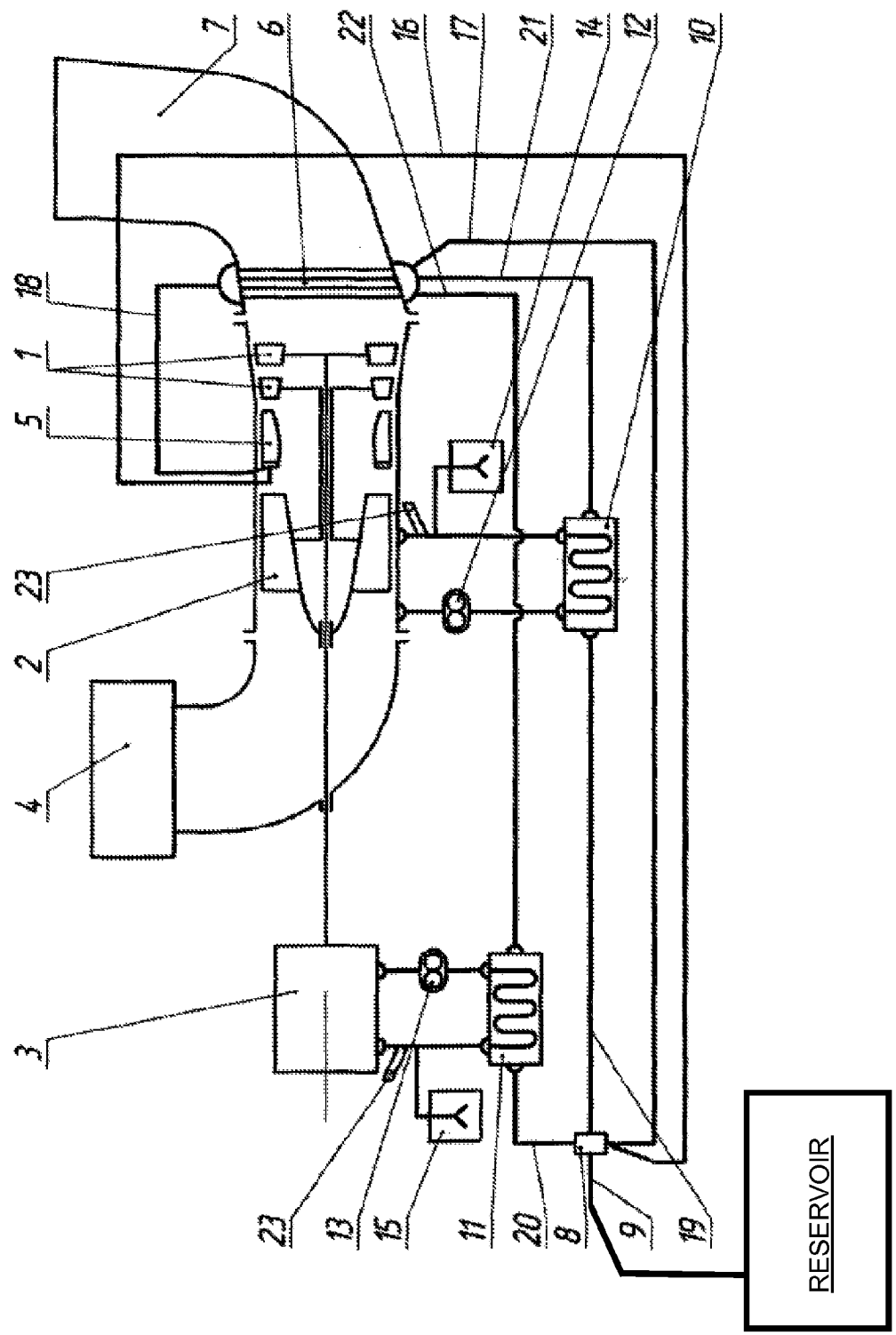

GAS TURBINE PLANT

CROSS REFERENCE TO RELATED APPLICATIONS

This is a National Phase Application filed under 35 U.S.C. 371 as a national stage of PCT/RU2008/000584, filed Sep. 4, 2008, the content of which is hereby incorporated by reference in its entirety.

FIELD OF THE INVENTION

This invention relates to the field of gas-turbine plants intended for use in gas-turbine locomotives, mobile and stationary power plants and is characterized by usage of a cryogenic gas fuel.

DESCRIPTION OF THE RELATED ART

A gas-turbine plant (GTP) for a two-unit gas-turbine locomotive having a tender for a liquid heavy-oil fuel is known. The known gas-turbine plant comprises a gas-turbine engine (GTE) having an axial compressor driving alternators (actuating units) via a reduction gear, an air-processing device for the GTE, a fuel system with combustion chambers, a fuel heater, a fuel pipeline connecting the combustion chambers to the tender fuel tank, a system for lubricating friction units of the GTE and the alternators (actuating units), which comprises a water-oil heat-exchanger, a supply pump and an oil tank. Oil in the water-oil heat-exchanger is cooled by water coming via hoses from the second locomotive unit where its temperature is lowered by a refrigerator of a diesel-locomotive type. [1]

Several disadvantages of this gas-turbine plant are:
a lubricating oil for the GTE and the electric alternators is cooled by the refrigerator for an auxiliary diesel-generator set of the gas-turbine locomotive, which is arranged in the other locomotive unit; this makes the inter-unit pipeline design more complicated and lowers its reliability (especially in winter);
extra power is required for driving a fan for cooling a lubricating oil;
loss of heat removed by a lubricating oil from the friction units of the gas-turbine engine and the alternators (actuating units).

GTPs of gas-turbine gas-compressor units are known wherein air-oil or water-oil coolers (heat-exchangers) are commonly used as oil coolers; in such cases several types of units comprise oil coolers mounted in the GTP air-intake duct, and air passes through them to the engine compressor input. [2]

Several disadvantages of this design are:
air temperature before the compressor raises by 3-5° C. in this design, which lowers the GTP power and efficiency;
there is loss of heat, which is removed by oil from the friction units in the gas-turbine engine and the actuating unit (pump), in heat-exchangers.

GTPs are known, wherein cooling air is supplied by electric fans through an oil cooler. [2]

The disadvantage of these GTPs is that a need arises to purchase electric fans with a control system, as well as extra expenses for power consumed by them are required.

Furthermore, known GTP designs are characterized by loss of heat, which is removed by oil from the friction units in the gas-turbine engine and the actuating unit (pump), in heat-exchangers.

A gas-turbine plant for a jet gas-turbine locomotive is known, which comprises a turbojet gas-turbine engine operating on a cryogenic gas fuel, a compressor for this engine with the input channel having an air intake, an air-cleaning device (air-processing device), a dual-fuel combustion chamber, a heat-exchanger-gasifier (fuel heater) of a liquefied gas heated by hot gases from the gas-turbine engine, system units (devices) for supplying a gas fuel and for automatic control. [3]

Several disadvantages of this plant are:
heat, which is removed by oil from the friction units of the gas-turbine engine, is not used;
a liquefied gas is heated and gasified in the heat-exchanger (heater) of fuel by hot gases from the gas-turbine engine only, which requires large dimensions of the heat exchanger.

SUMMARY OF THE INVENTION

The technical effect of this invention is the creation of an efficient gas-turbine plant having a compact oil cooling system and a fuel heater.

This technical effect may be achieved owing to that the gas-turbine plant comprises a gas-turbine engine with a compressor operating on a cryogenic gas fuel and driving the actuating units, an air-processing device for the gas-turbine engine, a fuel system with combustion chambers, a fuel heater mounted in the exhaust tube of the gas-turbine engine, a device for supplying and controlling fuel to which a fuel pipeline is connected from a reservoir for storing a cryogenic gas fuel and which is connected to the combustion chambers by fuel pipelines directly and via the fuel heater, a lubricating system having a lubrication loop for the friction units of the gas-turbine engine and actuating units, which includes a fuel-oil cooling heat exchanger, a supply pump and an oil tank, wherein the plant is provided with an oil cooling heat-exchanger made as a fuel-oil cooling heat-exchanger using a cryogenic gas fuel as a coolant, the lubricating systems for the gas-turbine engine and the actuating units are made as separate controlled circulation circuits, each having its own fuel-oil cooling heat-exchanger, supply pump and oil tank, each cooling cavity of the fuel-oil cooling heat-exchangers being connected at its input side to the device for supplying and controlling fuel and at its output side to the fuel heater by fuel pipelines.

Furthermore, the device for supplying and controlling fuel is connected to the oil temperature sensors located in the friction units of the gas-turbine engine and the actuating units.

BRIEF DESCRIPTION OF THE DRAWINGS

FIG. 1 shows a schematic diagram of the inventive gas-turbine plant with the lubrication system and the fuel system.

DESCRIPTION OF A PREFERRED EMBODIMENT

The inventive gas-turbine plant (GTP) comprises a gas-turbine engine (GTE) 1 with a compressor 2 operating on a cryogenic gas fuel and driving actuating units 3, for example, alternators, pumps, etc., as well as an air-processing device 4 for the GTE 1, a fuel system with combustion chambers 5, a fuel heater (gasifier) 6 mounted in the exhaust tube 7 of the GTE 1, and a device 8 for supplying and controlling fuel to which a fuel pipeline 9 is connected from a reservoir for storing a cryogenic gas fuel.

The GTP comprises lubrication systems and the lubrication loop for friction units (bearings, contact seals, gears, splined joints) of the GTE 1 and actuating units 3 made for them as separate controlled circulation circuits with their own fuel-oil cooling-heat exchanger 10 and 11 for the purpose of maintaining optimal oil temperatures. The oil-cooling heat-exchangers 10 and 11 are made as fuel-oil cooling-heat exchangers using a cryogenic gas fuel, which is supplied via the fuel pipeline 9, as a coolant. The controlled oil circulation circuits of the GTE 1 and the actuating units 3 comprise their respective supply pumps 12, 13 and oil tanks 14, 15 that are used for charging the circulation circuits and removing excess oil from them.

The device 8 for supplying and controlling fuel is connected to the combustion chambers 5 directly by the fuel pipeline 16 serving for starting the GTE 1, and by the fuel pipelines 17 and 18 via the fuel heater 6, wherein the pipeline 17 connects the device 8 to the fuel heater 6, and the pipeline 18 connects the fuel heater 6 to the combustion chambers 5.

The cooling cavities of the fuel-oil heat-exchangers 10 and 11 are connected at their input sides to the device 8 for supplying and controlling fuel by the fuel pipelines 19 and 20 and at their output sides to the fuel heater 6 by the fuel pipelines 21 and 22.

Friction unit oil temperature sensors 23 are provided at the outputs of the controlled circulation circuits of the GTE 1 and the actuating units 3, which are connected (not shown) to the device 8 for supplying and controlling fuel.

The gas-turbine plant may be operated as follows.

A cryogenic gas fuel is supplied via the fuel pipeline 9 from a reservoir for storing fuel to the device 8 for supplying and controlling fuel. Then fuel is supplied from the device 8 to the combustion chambers 5 via the fuel pipeline 16 during starting the GTE 1 and via the fuel pipeline 17 through the fuel heater 6 during operation of the GTE 1 and through the oil cooling cavities of the fuel-oil cooling heat-exchangers 10 and 11 which are connected to the controlled oil circulation circuits of the GTE 1 and the actuating units 3. Oil in these circuits is supplied by the supply pumps 12 and 13 to the friction units where it is heated and further supplied to the fuel-oil cooling heat-exchangers 10 and 11 for cooling by the cooling resource of the cryogenic gas.

After heating in the fuel-oil cooling heat-exchangers 10 and 11, a cryogenic gas is supplied to the fuel heater 6 where it, together with a cryogenic gas supplied via the fuel pipeline 17, is heated by gases escaping from the GTE 1, transformed into the gaseous state (is gasified) and supplied to the combustion chamber 5 via the fuel pipeline 18. Combustion products having a high temperature and a high pressure are formed in the combustion chamber 5 due to burning of a mixture of the fuel gas and compressed air supplied from the compressor 2. These combustion products, while expanding, set the GTE 1 into motion and after that exit from the gas-turbine plant to the atmosphere through the exhaust tube 7 and the fuel heater 6.

An oil temperature in the controlled oil circulation circuits after escaping from the friction units of the GTE 1 and the actuating units 3, is controlled by the device 8 for supplying and controlling fuel with the use of the sensors 23.

INDUSTRIAL APPLICABILITY

The proposed invention enables to return heat, which is removed by oil from the lubricated friction units of the gas-turbine engine and the actuating units driven by it, to the thermodynamic cycle of the gas-turbine engine, which improves the efficiency of the gas-turbine plant. Moreover, the power consumed for the plant intrinsic needs is lowered, the design of the oil-cooling system is simplified to a great extent, the fuel heater may be made in lesser dimensions due to heating of a cryogenic gas in the fuel-oil cooling heat-exchangers.

REFERENCES

1. <<Locomotive>> Magazine No. 3, 2005, p. 41, V. S. Kossov, E. I. Nesterov, <<Gas-Turbine Traction: History and Prospects>>.
2. V. A. Schurovsky, Yu. A. Zaitsev. Gas-Turbine Compressor Unit. M., Nedra Publishing House, 1994, p. 85, 87, 88.
3. RU Patent No. 2251505 C1, B 61C Nov. 6, 2005.

What is claimed is:

1. A gas-turbine plant comprising:
   a gas-turbine engine having an air-processing device, a compressor, and combustion chambers operating on a cryogenic gas fuel to supply combustion gases to an exhaust tube, the gas-turbine engine driving actuating units;
   a fuel system coupled to the combustion chambers;
   a fuel heater mounted in the exhaust tube of the gas-turbine engine;
   wherein the fuel system having fuel pipelines and a device for supplying and controlling fuel to the combustion chambers, the device is connected to a fuel pipeline from a reservoir for storing the cryogenic gas fuel and which is connected to the combustion chambers by fuel pipelines via the fuel heater;
   a lubricating system for friction units of the gas-turbine engine and actuating units, wherein the lubrication system includes a lubrication loop for the friction units of the gas-turbine engine having a fuel-oil cooling heat-exchanger, a supply pump and an oil tank and a lubrication loop for the friction units of the actuating units having a fuel-oil cooling heat-exchanger, a supply pump and an oil tank;
   wherein a first fuel pipeline of the fuel pipelines connects the device to the fuel-oil cooling heat-exchanger of the lubrication loop of the actuating units and the fuel heater, and a second fuel pipeline of the pipelines connects the device to the fuel-oil cooling heat-exchanger of the lubrication loop of the gas-turbine engine and the fuel heater.

2. A gas-turbine plant according to claim 1, characterized in that the device for supplying and controlling fuel is connected to oil temperature sensors for the friction units of the gas-turbine engine and the actuating units.

* * * * *